Figure 1:
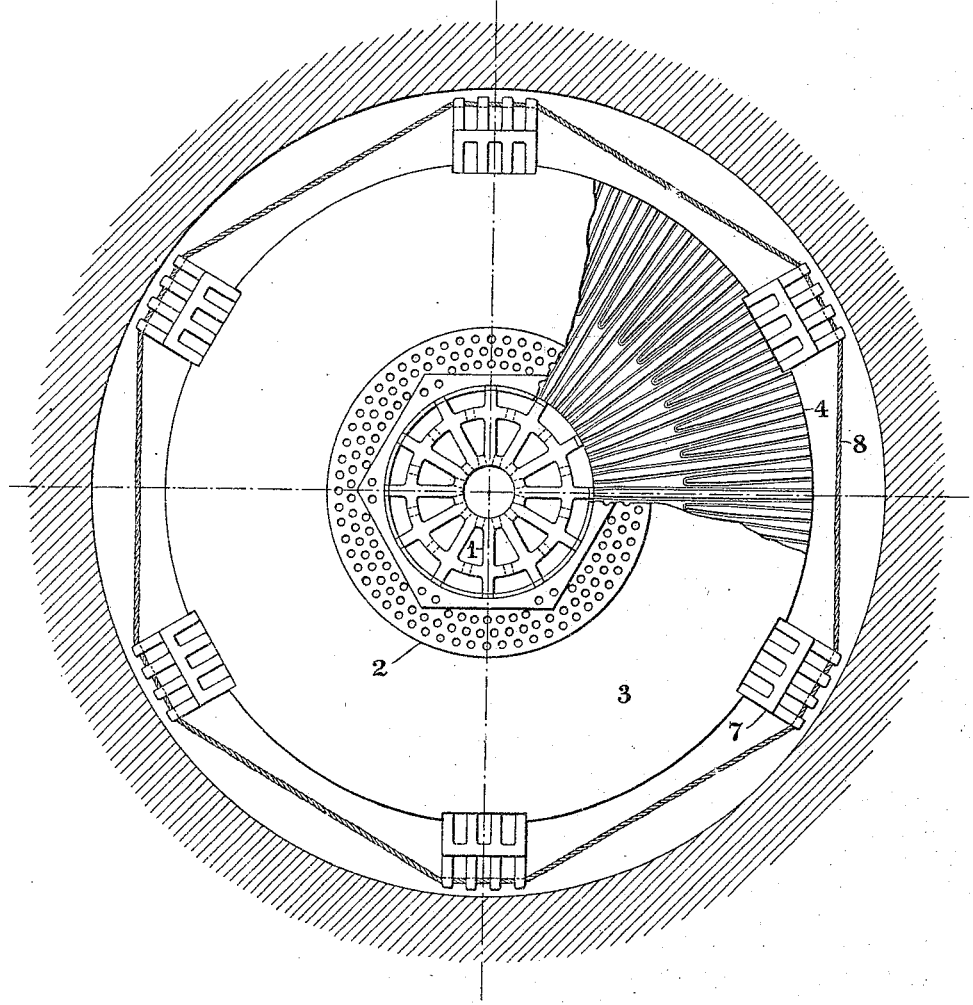

No. 776,652. PATENTED DEC. 6, 1904.
A. H. EMERY.
CARTRIDGE.
APPLICATION FILED MAR. 11, 1903.
NO MODEL. 9 SHEETS—SHEET 1.

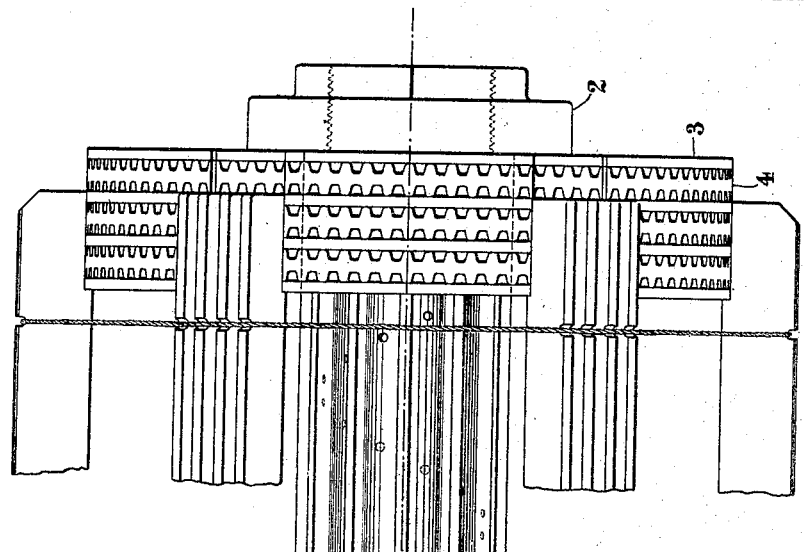
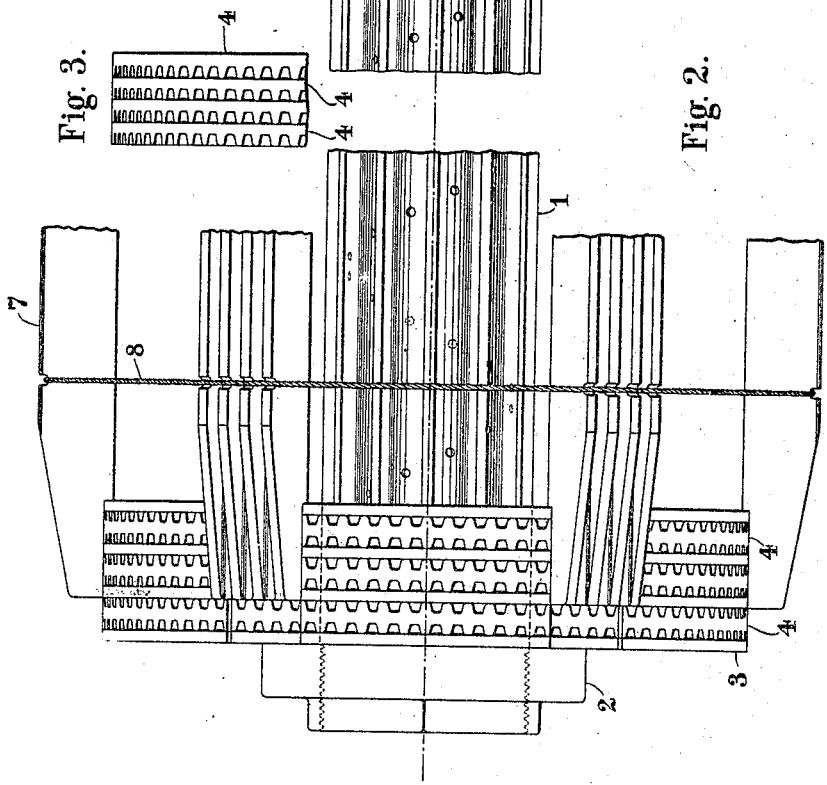

No. 776,652. PATENTED DEC. 6, 1904.
A. H. EMERY.
CARTRIDGE.
APPLICATION FILED MAR. 11, 1903.
NO MODEL. 9 SHEETS—SHEET 3.

WITNESSES:
H. E. Manning
Harold Hurd

INVENTOR
Albert H. Emery
BY
Knight Bros
ATTORNEYS

No. 776,652. PATENTED DEC. 6, 1904.
A. H. EMERY.
CARTRIDGE.
APPLICATION FILED MAR. 11, 1903.
NO MODEL. 9 SHEETS—SHEET 4.

WITNESSES: INVENTOR
Albert H. Emery
BY
Knight Bros
ATTORNEYS

No. 776,652. PATENTED DEC. 6, 1904.
A. H. EMERY.
CARTRIDGE.
APPLICATION FILED MAR. 11, 1903.
NO MODEL.
9 SHEETS—SHEET 5.

WITNESSES:

INVENTOR

BY

ATTORNEY

No. 776,652. PATENTED DEC. 6, 1904.
A. H. EMERY.
CARTRIDGE.
APPLICATION FILED MAR. 11, 1903.
NO MODEL. 9 SHEETS—SHEET 6.

No. 776,652. PATENTED DEC. 6, 1904.
A. H. EMERY.
CARTRIDGE.
APPLICATION FILED MAR. 11, 1903.
NO MODEL. 9 SHEETS—SHEET 7.

WITNESSES: INVENTOR
ATTORNEYS

No. 776,652. PATENTED DEC. 6, 1904.
A. H. EMERY.
CARTRIDGE.
APPLICATION FILED MAR. 11, 1903.
NO MODEL. 9 SHEETS—SHEET 8

WITNESSES:

INVENTOR
Albert H. Emery
BY
ATTORNEYS

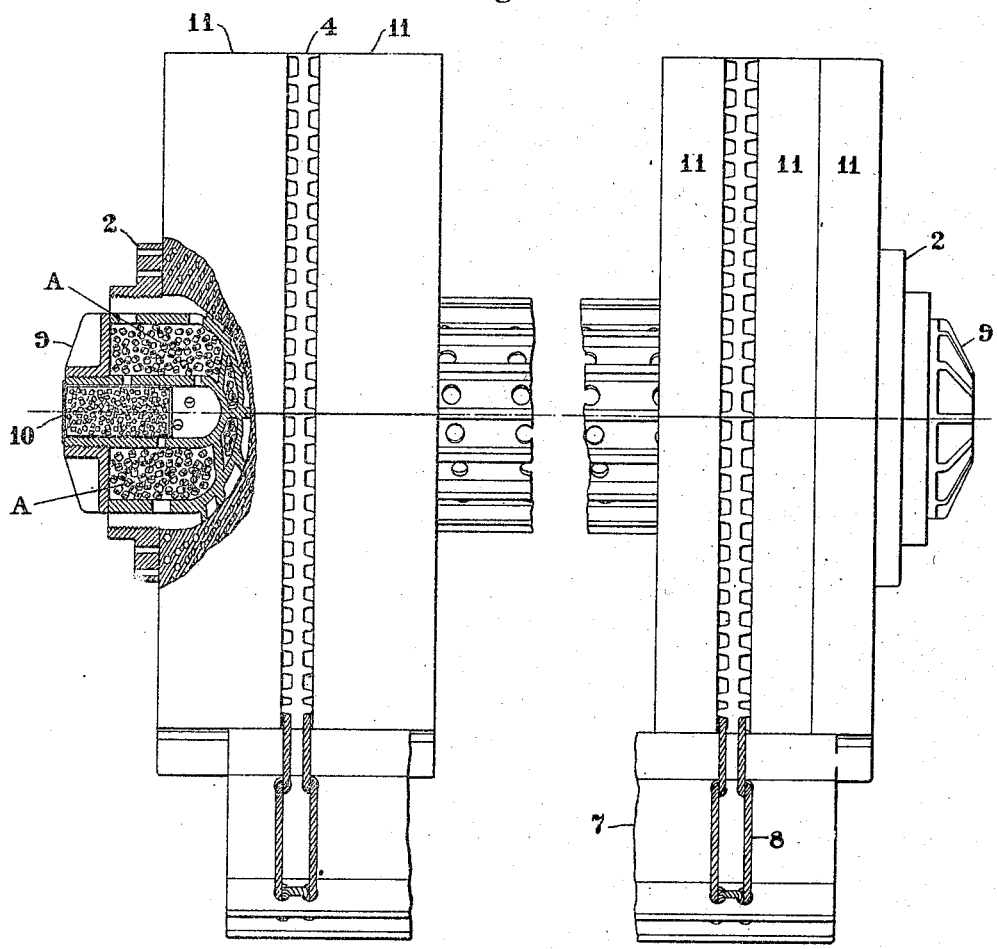

No. 776,652. Patented December 6, 1904.

UNITED STATES PATENT OFFICE.

ALBERT H. EMERY, OF STAMFORD, CONNECTICUT.

CARTRIDGE.

SPECIFICATION forming part of Letters Patent No. 776,652, dated December 6, 1904.

Application filed March 11, 1903. Serial No. 147,346. (No model.)

*To all whom it may concern:*

Be it known that I, ALBERT H. EMERY, a citizen of the United States, and a resident of the city of Stamford, county of Fairfield, State of Connecticut, have invented new and useful Improvements in Cartridges, which invention is fully set forth in the following specification.

When a cartridge is made up in the usual way by bags of grain-powder, three things happen.

First. The powder is not symmetrically disposed in the chamber of the gun, there usually being much more in the lower half than in the upper half of the chamber, causing the powder to burn more rapidly in the lower part of the chamber than in the upper, developing a much greater pressure on the lower face of the chamber than on the upper when the powder is violently thrown from the lower to the upper part of the chamber. The seat of greatest activity of combustion being the upper part of the chamber, the cartridge may be violently thrown again to the lower side of the chamber, the cartridge at the same time moving forward with the rush of the gases following the projectile in its forward movement. There may thus be produced one, two, or even more (usually one) violent movements of a large portion of the cartridge from one side of the chamber to the other, giving rise to serious disturbing strains, sometimes sufficient to bend the muzzle of the gun downward, especially if aided by the recoil of the gun upwise inclined to the axis of firing.

Second. When the cartridge is made of grain powder, perforated or otherwise, placed in bags lying on the bottom of the chamber, it is very difficult to light the whole cartridge simultaneously or uniformly, without which uniform time of burning and action of the cartridge cannot be had. The first trouble gives inaccuracy of fire even with constant velocities of the projectile, while this irregularity of lighting will give irregular velocities, and therefore inaccuracy of fire, even with powder of uniform construction.

Third. When grain powder is placed in bags unsymmetrically disposed or even symmetrically disposed, unequal lighting may cause a considerable portion of the charge to be wedged into the neck of the chamber where the powder in an unburned and sometimes in an unlighted mass is being forced into the bore of the gun. This wedging there of the hard-grain smokeless powder may be sufficient to cause a rapid and undue increase of pressure and consequent undue rapidity of burning of the powder and cause the bursting of the gun, the accident being laid to the quality of the powder, which may have been perfectly good and uniform.

To avoid all three of these evils, the cartridge, whether large or small, should always be placed symmetrically in the center of the chamber of the gun and lighted uniformly throughout its mass and so constructed that it cannot wedge in passing from the chamber into the bore of the gun.

My invention relates to cartridges for guns, to the form of grains of explosives, to the form and proportions of the cartridges, to the method of building up the cartridge with a diameter less than that of the bore of the gun from which it is to be fired, to the method of holding it in the axis of the gun in which it is to be fired, to the form of the cells or perforations in the grains or sections of the cartridge, to the method of securing the parts of the cartridge, to the form of the rods or tubes which secure the parts together, and to various details of form, arrangement, and construction of the different parts of the cartridge, which will be hereinafter fully explained.

My invention is illustrated by the accompanying nine sheets of drawings, in which—

Figure 6:
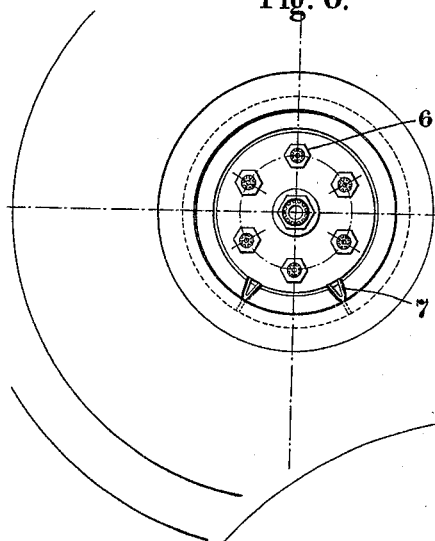
Figure 7:
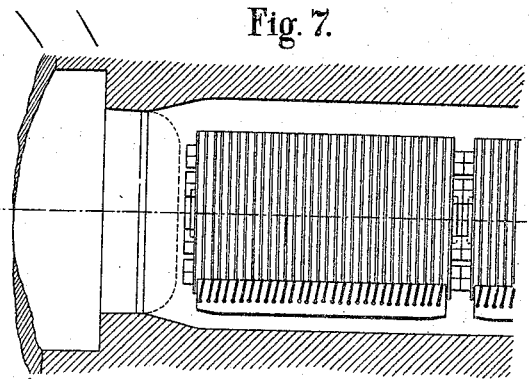
Figure 4:
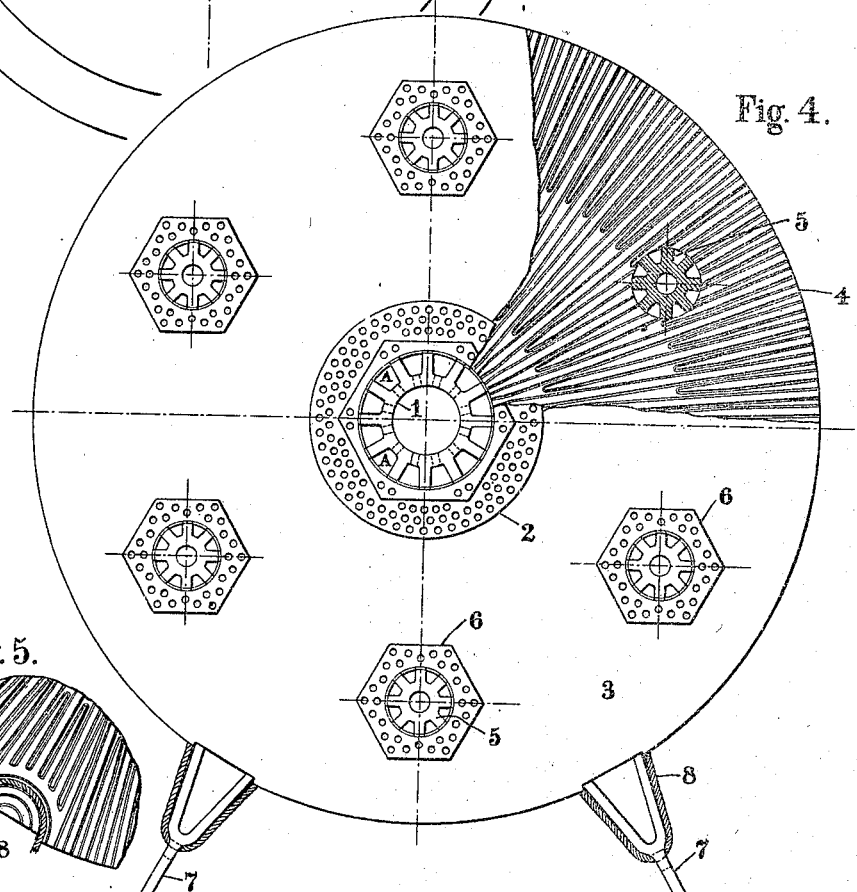
Figure 5:
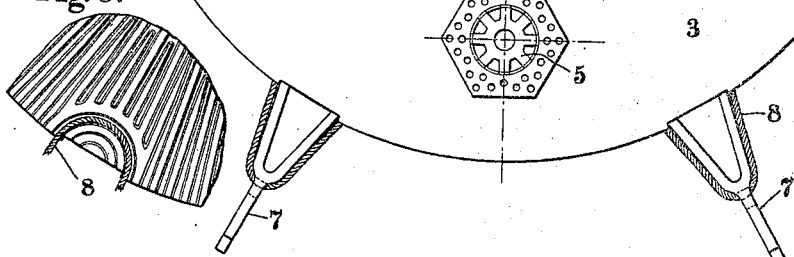
Figure 8:
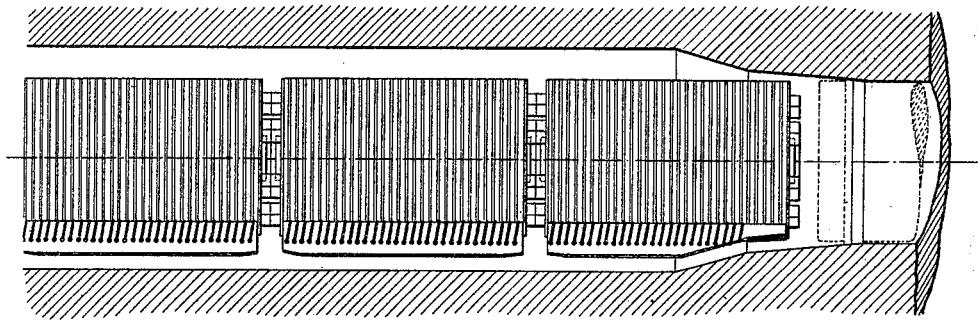
Figure 9:
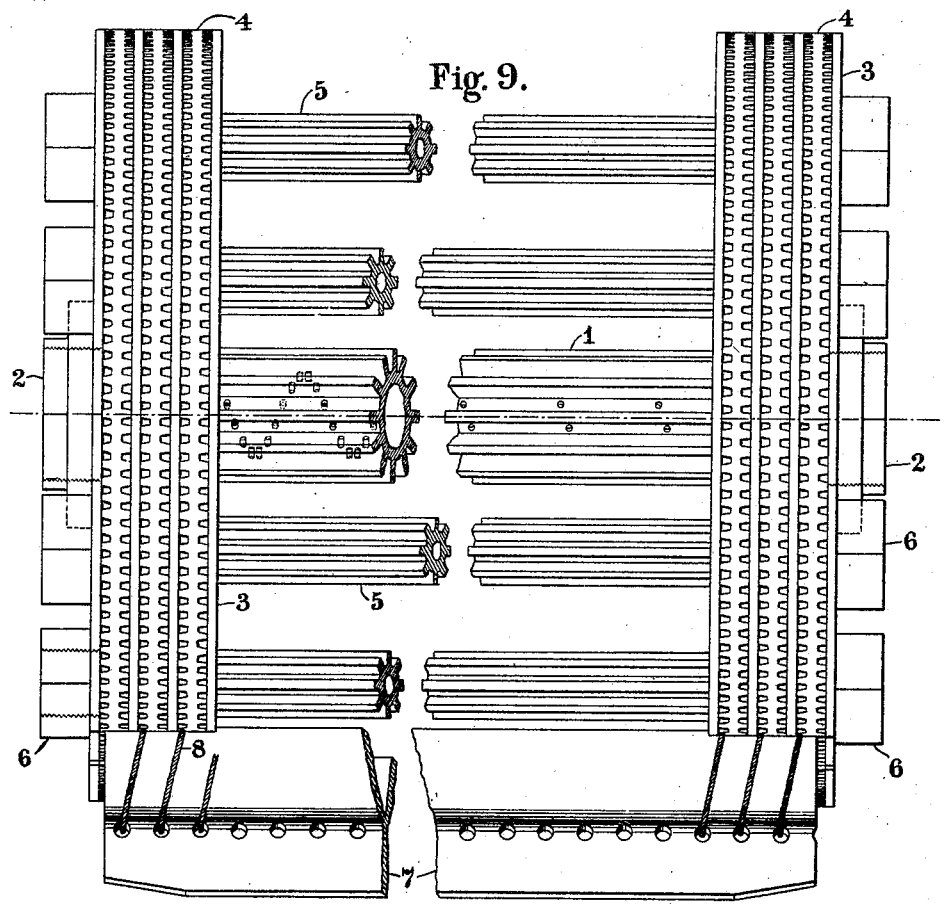
Figure 10:
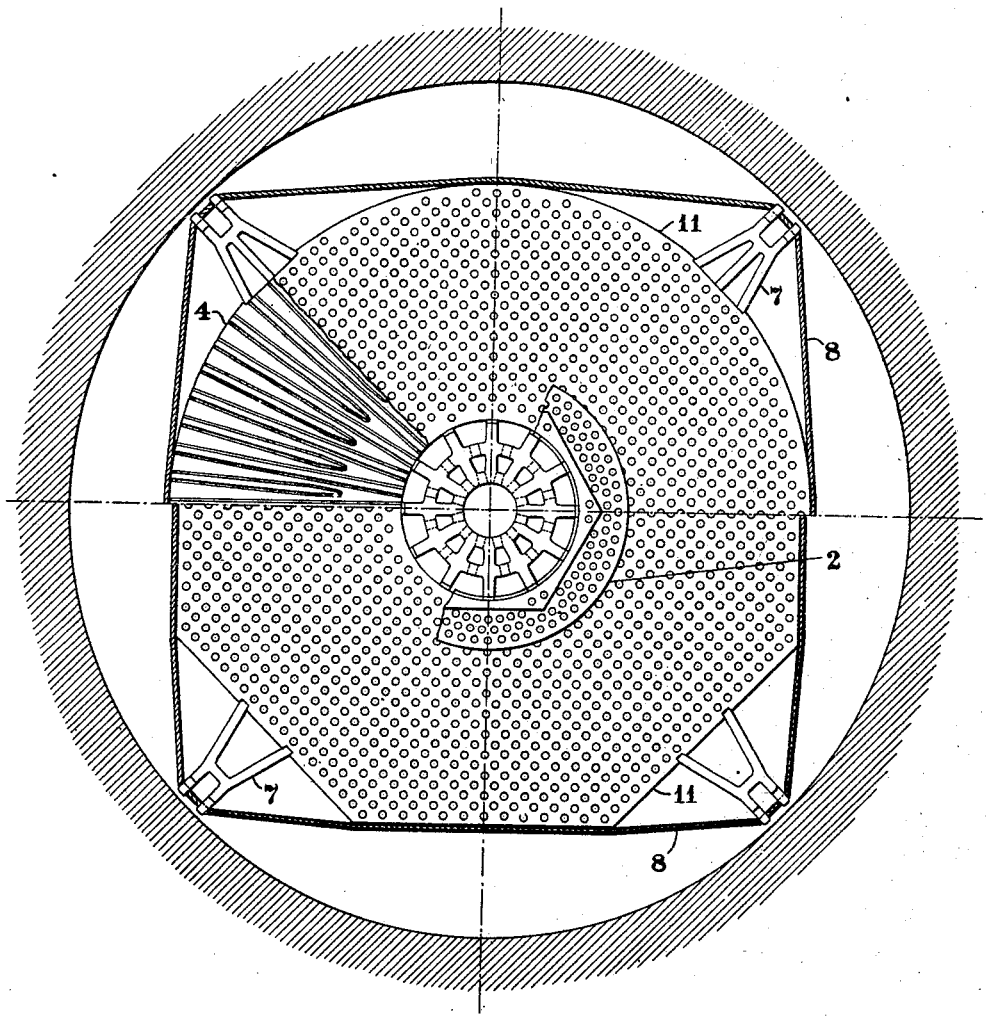
Figure 11:
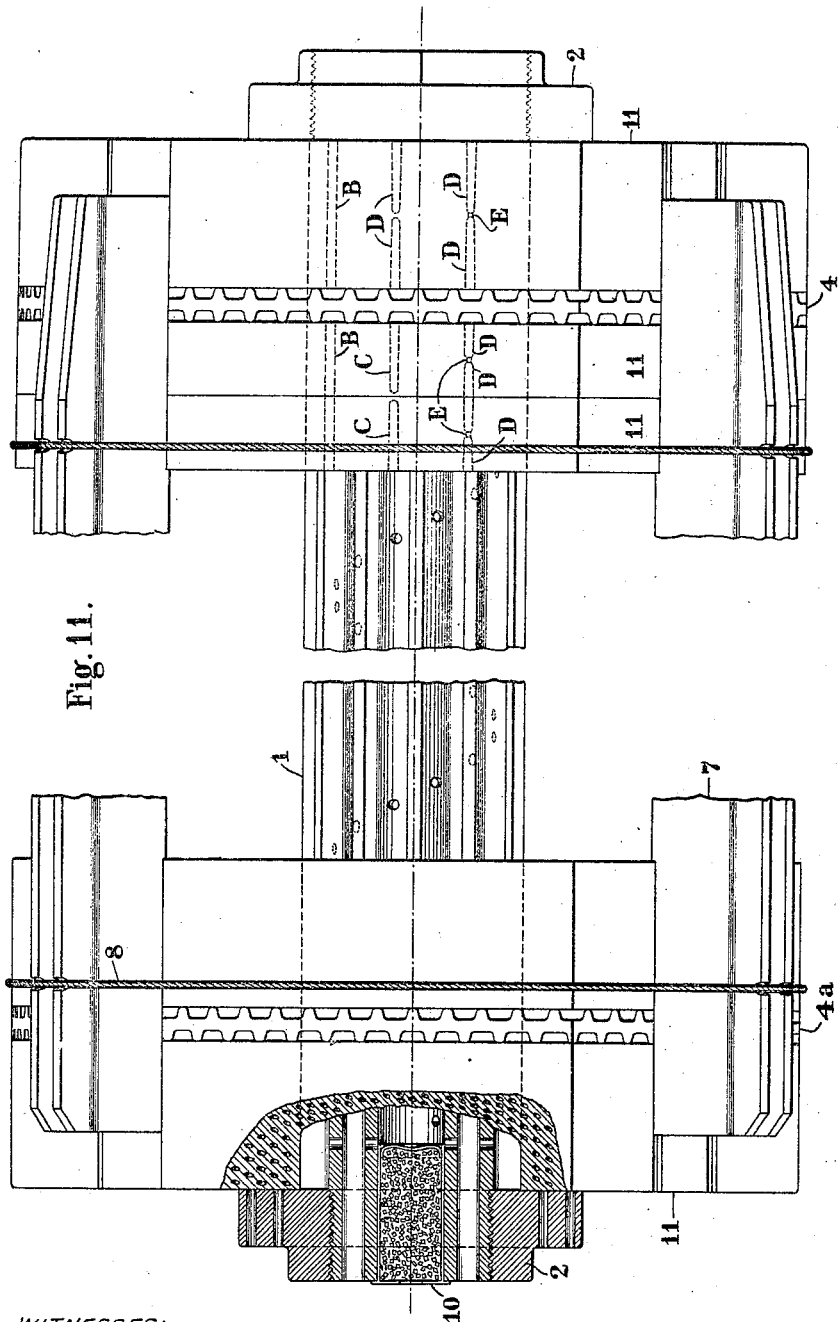
Figure 12:
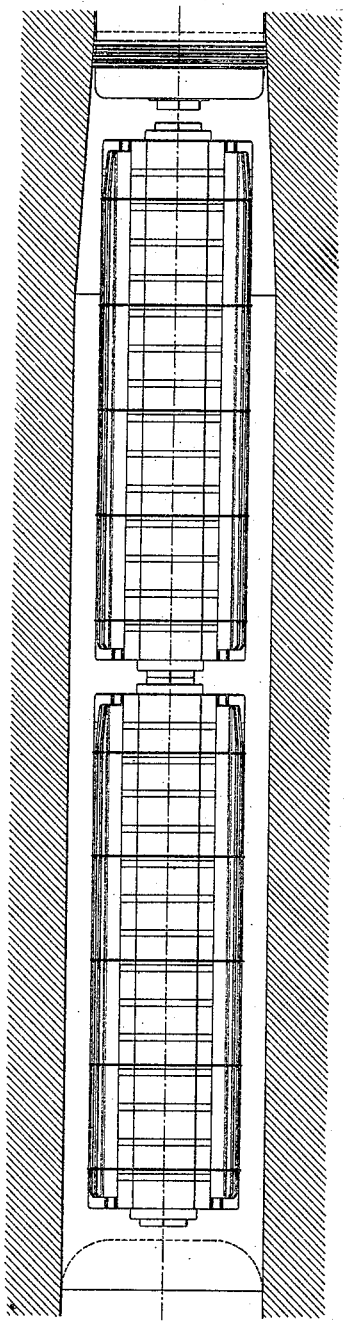
Figure 13:
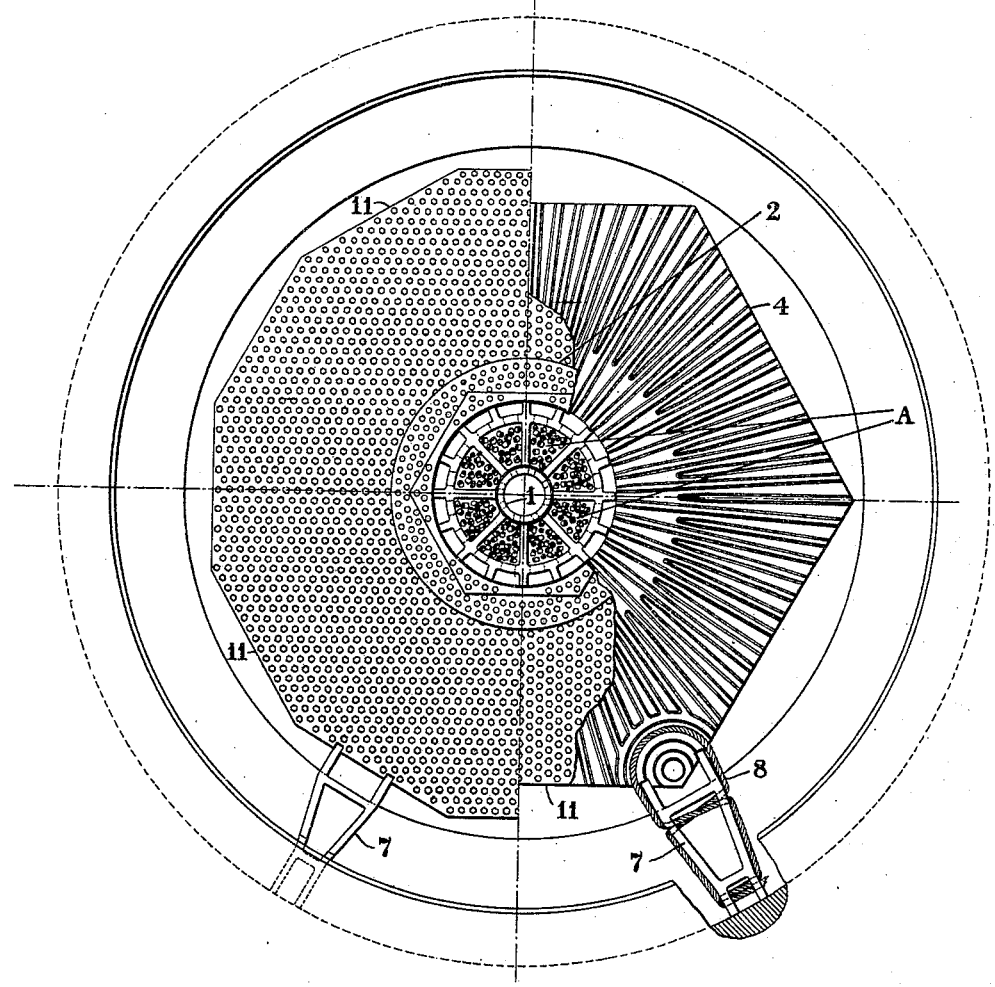

Figure 1 shows an end view of a complete cartridge centered in the chamber of the gun with a portion of the end plate broken away to show a part of a ribbed plate. Fig. 2 is a side elevation of the same with a portion of the cartridge broken away. Fig. 3 shows a portion of a side view of special form of ribbed plates. Fig. 4 is an end view of a complete cartridge with a portion of the end plate broken away to show a part of a ribbed plate and one of the securing-bolts in section. Fig. 5 is a detail of form of a portion of a ribbed plate, showing method of securing centering-legs to the cartridge. Fig. 6 is an end view of a cartridge centered in the chamber of a gun where the diameter of the chamber is greater than that of its neck at the breech of the gun. Figs. 7 and 8 show a side view of the same cartridge in the chamber of the gun where the diameter of the chamber is greater than that of its neck at the breech of the gun, the whole cartridge being made up of four sections for convenience of transportation and loading. Fig. 9 shows a side elevation of one section of this cartridge with a large part of the central portion removed to show the rods which secure the cartridge together. Fig. 10 is an end view of a cartridge centered in position in a gun, the two halves of the view showing two forms of outline of longitudinally-perforated sections, a portion of a section being broken away to show the form of a ribbed separating and venting plate. Fig. 11 shows a portion of the side elevation of the two forms of cartridge shown in end elevation in Fig. 10, a portion of a section being broken away to show a section of the central stem, its nut, and the firing charge. Fig. 12 shows a cartridge made up of two sections and placed in the chamber of a gun, the construction of the cartridge being that illustrated in Figs. 10 and 11. Fig. 13 is an end view of two forms of outline of a cartridge centered in the chamber of a gun where the diameter of the chamber is much larger than that of the neck of the chamber through which the cartridge is introduced, a portion of the end longitudinally-perforated section being broken away to show the form of the ribbed separating and venting plates. Fig. 14 shows a side elevation of the hexagonal form of cartridge shown in Fig. 13, the central portion of the cartridge being removed, leaving the two ends, one of which is partly in section.

The cartridges herein illustrated will be for the most part made up of smokeless powder. In all of these cartridges there is a central stem 1, usually made of explosive material, around which the main parts of the cartridge are assembled and by which they are partly or wholly secured together by nuts 2.

In Figs. 1, 2, 4, and 9 the cartridges are for the most part made up of thin flat plates 3 of explosive material separated by ribbed plates 4, which are usually provided on each transverse face with a series of ribs, which form lighting and venting passages and greatly increase the surface of combustion. In all the drawings the ribs are shown radial with a greater number at the exterior than at the interior; but they may be straight and arranged in any manner desired, or they may be spiral, if preferred. In Fig. 3 these ribs are shown on one side of the plates only; but when so made it is difficut to keep the ribbed plate flat. In Figs. 2, 9, 11, and 14 the plates are ribbed symmetrically on the opposite faces and in each case with the ribs on one side opposite those on the other, with the single exception of the plate 4ª in Fig. 11, where the ribs on one side are shown opposite the spaces on the other side of the plate. When so arranged, the complete combustion of the plate occurs more quickly than when the ribs are opposite each other, and this particular arrangement of ribs I have described and claimed in my application, Serial No. 147,543, filed March 12, 1903.

The central stem 1 is shown in Figs. 4, 9 as a single tube with exterior longitudinal ribs to stiffen it, and while making a large stiff tube the walls are all thin and of comparatively uniform thickness, so it will burn up quickly. In Figs. 1, 10, and 13 this central stem is formed with two concentric tubes connected together by longitudinal ribs, the outer tube having also outer longitudinal ribs. This construction gives a stiffer stem than one with a single tube. The spaces between the external ribs on the central tube and surrounding parts provide lighting and venting passages through which the igniting-gases pass to light that part of the cartridge around the central tube and through which some of the gases formed prior to longitudinal separation of the disks pass to the front of the cartridge. The cartridge is secured on this central stem by nuts 2, best made of explosive material and perforated to increase the burning-surface and regulate the time of combustion. The central stems are perforated at suitable distances to allow the flames from the igniting charge to pass from the interior to the exterior into the vents or igniting-passages of the ribbed plates to ignite the whole cartridge.

The central tube 1 may be replaced or supplemented by bolts or rods 5, best made of explosive material, which are put through the plates or sections forming the main body of the cartridge, which they secure and hold together by the use of nuts 6, which are best made of explosive material. Six of these rods are shown in Figs. 4 and 6. Unless very small they should be made hollow and ribbed, either or both, to aid in quick burning.

Figs. 1, 4, 6, 10, and 13 show end views of cartridges with centering legs, ribs, or arms 7 secured to them, which hold the cartridge coaxially in the chamber of the gun. These could be made of wood, papier-mâché, or any other suitable material; but I prefer to make them of smokeless powder, which is very strong and holds the cartridge securely in place. These parts 7 may be simply projecting portions of the plates or sections forming the cartridge; but I prefer to make them in long longitudinal strips of convenient form to be attached to the cartridge with sufficient strength to endure transportation and loading and so ribbed or divided up into thin plates that they will be consumed with the rest of the cartridge to which they may be secured by any convenient means. In Figs. 1, 2, 10, 11, and 12 they are shown secured to the cartridge by strings 8 passing completely around the cartridge, while in Figs. 4, 5, 9, 13, and 14 they are secured by strings 8, which pass around or through a single supporting rib or leg and around lugs on the ribbed plates. (See Figs. 5 and 13.) These strings 8 are best made of some material which will burn very rapidly to loosen the legs from the rest of the cartridge when firing takes place. These ribbed legs or centering-supports 7 are all shown with a longitudinal cell next to the cartridge. The gases of combustion from the walls of this cell if made of explosive material, aided by the gases from the cartridge, force and hold these parts 7 against the wall of the chamber, leaving the cartridge free to move on with the flow of gases toward the muzzle of the gun.

I prefer to make the outer diameter of the main part of the cartridge somewhat smaller than the bore of the gun, so that under the general flow of the gases forward the different sections of the cartridge may be moving forward together into the bore of the gun without damming or choking at the front end of the chamber where it reduces to the size of the bore. The threads on the stem 1 and nuts 2 of explosive material quickly burn off and allow each section of the cartridge to separate longitudinally, distributing the parts of the cartridge with comparative uniformity between the projectile and the breech-block. By making the diameter of the main part of the cartridge smaller than the bore of the gun and holding it coaxial in the chamber by the legs 7 large longitudinal spaces are left around the cartridge between the legs 7, into which the gases of combustion pass from the vents in the ribbed plates 4 and through which they pass longitudinally into the bore of the gun.

Central stem 1, the plain plates 3, and ribbed plates 4, rods 5, and legs 7 all give practically a constant surface of combustion during the burning of the cartridge, so that a cartridge so formed does not give good results except it be used in a gun with a very large chamber, such as is shown in Figs. 6, 7, and 8. The legs for the cartridge for this chamber will be placed on the lower side of the cartridge only, as shown in Figs. 4, 6, 7, 8, 9, 13, and 14, to allow the cartridge to be inserted through the reduced neck of the chamber. These cartridges as a whole are usually made in several pieces for convenience in handling. In Fig. 12 one is shown in two pieces or sections, while in Figs. 7 and 8 in four.

The cells formed by the ribs of the central tube are of great convenience for introducing powder with a different rate of combustion than that in the plates 3 and 4. The action of the cartridge may be greatly modified by putting into these cells a quick-burning powder to aid the rest of the cartridge in quickly giving a high pressure before the shot moves far in the bore of the gun. The powder placed in these pockets is secured by the ribbed cap-nuts 9, best made of explosive material. (Shown in Fig. 14.) In Figs. 4 and 13 these pockets or cells are marked A. In one of them, in Fig. 14, is shown some quick-burning powder. The reason for the use of these pockets of quick-burning powder and my claims therefor are fully set forth in another application of March 12, 1903, Serial No. 147,543.

In Figs. 11 and 14 a lighting charge 10 of quick-burning powder is shown in the central stem 1, which blows through the hole in the stem from one section of the cartridge to another, also carrying the flames laterally through the small holes in said stem into the powder in the cells A. These flames also blow through into the radial passages or vents of the ribbed plates, and so light the whole cartridge simultaneously.

In Figs. 10, 11, 12, 13, and 14 the thin plates 3 are replaced by thick plates or sections 11, which should be perforated with a great number of longitudinal holes. These cellular sections of powder give a rapidly-increasing surface of combustion as the cartridge burns, which aids in keeping up the pressure of the gases as the velocity of the projectile increases in its passage toward the muzzle of the gun. These perforations may pass entirely through the section, as shown at B, Fig. 11, where the sections are shown of two lengths or thicknesses, one twice that of the other, as they are also shown in Fig. 14. Owing to the minuteness and great number of these perforations, there may be difficulty in making them uniform in position when the plate or section 11 is very long or thick, and they may be made by needles which do not go quite through the plate from one side only, as shown at C, Fig. 11, or by needles which do not go quite half through the plate from both sides, (shown at D, Fig. 11.) These holes D may be connected by smaller holes, as shown at E.

In most cases in perforating sections of a cartridge or powder grains the holes have been made cylindrical or conical, having walls of variable thickness. In Fig. 10 I have shown the outline of the main cartridge as cylindrical in one half and octagonal in the other, with the perforations in the section 11 as cylindrical; but I prefer to make these holes hexagonal, as shown in Fig. 13, of uniform size and spacing, by which the great mass of the walls are of uniform thickness and should be so proportioned as to burn through before the projectile leaves the gun. In Fig. 13 the outline of the cartridge is shown as hexagonal in one half and duodecahedral in the other. The outline of these sections could be changed, if desired, to give uniform thickness to the walls of the outer perforations.

Having thus described the invention, the following is what I claim as new therein:

1. A plate for cartridges, constructed of explosive material, and having upon one of its faces a series of ribs extending from the exterior toward the interior, raised on said surface to increase the burning-surface and when combined in the cartridge, to form passages for lighting the cartridges uniformly and permitting the escape of powder-gases.

2. A plate for cartridges, constructed of explosive material, and having upon its opposite faces a series of ribs extending from the exterior toward the interior, raised on said surface to increase the burning-surface and when combined in the cartridge, to form passages for lighting the cartridge uniformly and permitting the escape of powder-gases.

3. A plate for cartridges, constructed of explosive material, and having upon one of its faces a series of radial ribs, raised on said surface to increase the burning-surface and when combined in the cartridge, to form passages for lighting the cartridge uniformly and permitting the escape of powder-gases.

4. A plate for cartridges, constructed from explosive material, and having a series of raised surface ribs extending from the interior to the exterior.

5. A plate for cartridges, constructed from explosive material, and having upon its face a series of raised ribs extending from the interior to the exterior, and shorter intermediate ribs extending from the exterior inward.

6. A plate for cartridges, constructed of explosive material, and having radial ribs extending from the interior to the exterior of one of its faces, with intermediate shorter ribs in the widened radial spaces between said radial ribs.

7. A plate of explosive material for cartridges, constructed with ribs on its opposite faces said ribs extending from the exterior toward the interior, the ribs on one face being located symmetrically with and opposite to those on the other face.

8. A cartridge constructed with transverse sections or plates of explosive material; some of which plates are provided with outwardly-extending ribs on their transverse faces, forming lighting-passages and vents for the cartridge.

9. A cartridge constructed with transverse plates or sections of explosive material; some of said plates or sections being provided with ribs extending from the interior outward, and the ribs of one plate or section abutting the plane surface of an adjoining plate or section.

10. A cartridge composed of a longitudinal series of short sections or plates and plates interposed at suitable intervals, having on their transverse faces, a series of outwardly-extending ribs, forming igniting-passages and vents.

11. A cartridge constructed with a longitudinal series of short transverse sections of explosive material; each separated from adjacent sections by thin plates having ribs extending from the interior outwardly, forming igniting passages and vents.

12. A cartridge constructed with short transverse sections having a large number of longitudinal holes forming a burning-surface which increases as combustion progresses and separating-plates interposed at suitable intervals, having outwardly-extending igniting and venting passages.

13. A cartridge constructed with short transverse sections having a large number of longitudinal holes forming a large burning-surface which increases as burning progresses; igniting and venting passages being provided between the sections, and said holes extending from the igniting-passages nearly through the sections.

14. A cartridge constructed with short transverse sections each having a large number of longitudinal holes forming a large burning-surface which increases as burning progresses; igniting and venting passages being provided between the sections, said holes extending from the opposite faces of the sections, toward one another, reaching nearly to the middle plane, and forming igniting-passages throughout the whole section.

15. A central firing-tube of explosive material around which the main body of the cartridge is assembled, said tube being constructed with a series of external projecting ribs forming lighting passages and vents for the cartridge and secured in the cartridge by nuts of explosive material screwed on the ends of the tube.

16. A central tube of explosive material around which the main body of the cartridge is assembled, and secured by nuts of explosive material screwed on the ends of the tube; said nuts being provided with small holes to cause the nuts to be consumed with the rest of the cartridge.

17. A cartridge constructed with a series of transverse sections or plates around a central stem, and separated from each other by thin ribbed plates of explosive material.

18. A cartridge constructed with a series of transverse sections or plates around a central stem of explosive material and separated from each other by thin ribbed plates, the ribs of which when the parts of the cartridge are assembled help to form lighting-passages and vents for the burning cartridge.

19. A cartridge or a section of a cartridge made up principally of a longitudinal series of plates or sections separated from each other at proper intervals by thin ribbed plates and secured together by one or more bolts or tubes of explosive material.

20. A cartridge or a section of a cartridge made up principally of a longitudinal series of plates or sections separated from each other at proper intervals by thin ribbed plates and secured together by one or more bolts or tubes of explosive material provided with longitudinal ribs to stiffen and strengthen them.

21. A cartridge provided with exterior projections to center and support it in the gun-chamber.

22. A cartridge provided with exterior centering and supporting projections extending longitudinally of the cartridge.

23. A cartridge provided with exterior projections of explosive material to center and support it in the gun-chamber.

24. A cartridge provided with exterior projections to center and support it in the gun-chamber, and with means securing said projections thereto.

25. A cartridge provided with centering and supporting projections extending longitudinally of the cartridge; said projections being constructed of thin longitudinal ribs of explosive material.

26. A cartridge provided with centering and supporting projections extending longitudinally of the cartridge; said projections being each constructed of two or more thin longitudinal ribs suitably joined together.

27. A cartridge provided with centering and supporting projections extending longitudinally of the cartridge; said projections being each constructed of two or more thin longitudinal ribs of explosive material suitably joined together.

28. A cartridge provided with centering and supporting projections or legs constructed each with two or more ribs resting against the cartridge and suitably joined together to form a recess or recesses, to receive gases blowing out of the cartridge, causing the leg or ribs to be held out against the walls of the chamber and allowing the main body of the cartridge to move toward or into the bore of the gun.

29. A cartridge made up of a longitudinal series of transverse plates or sections, centering and supporting legs, and means securing said legs to the cartridge consisting of recesses formed in said plates or sections at suitable intervals, and strings or wires passed through said recesses and through or around the legs.

30. A cartridge constructed with a diameter less than the diameter of the bore of the gun in which it is to be used, and having centering and supporting legs or projections holding the cartridge coaxial with the bore when placed in the chamber of the gun.

31. A cartridge constructed with centering and supporting legs or projections; the legs or projections being separable from the body of the cartridge at the time of firing and the diameter of the body of the cartridge being less than that of the bore of the gun, in which it is to be fired, to permit it to pass on into the bore without wedging or breaking up at the neck of the chamber in which it is fired.

32. A cartridge constructed with a longitudinal series of transverse plates or sections suitably secured together, with a diameter smaller than that of the bore of the gun in which it is to be fired, and having centering and supporting legs or projections holding it in the axis of the gun.

33. A cartridge constructed with a longitudinal series of transverse plates or sections suitably secured together, with a diameter smaller than that of the bore of the gun in which it is to be fired, and having centering and supporting legs or projections holding it in the axis of the gun; the plates or sections being separable from one another under the action of burning, whereby the burning plates or sections of the cartridge are separated longitudinally under the flowing action of the powder-gases and distributed throughout the space between the breech-block and the projectile, during the passage of the latter through the bore of the gun.

The foregoing specification signed this 10th day of March, 1903.

ALBERT H. EMERY.

In presence of—
   ALBERT H. EMERY, Jr.,
   EDWIN S. CLARKSON.